INVENTOR.
Robert H. Rines
BY
David Rines
ATTORNEY

May 22, 1951 R. H. RINES 2,553,606

PLURAL IMAGE RADIO LOCATOR SYSTEM

Filed Oct. 9, 1944 5 Sheets-Sheet 2

INVENTOR.
Robert H. Rines
BY David Rines
ATTORNEY

INVENTOR.
Robert H. Rines
BY
David Rines
ATTORNEY

May 22, 1951 R. H. RINES 2,553,606

PLURAL IMAGE RADIO LOCATOR SYSTEM

Filed Oct. 9, 1944 5 Sheets-Sheet 4

INVENTOR.
Robert H. Rines
BY
David Rines
ATTORNEY

May 22, 1951 R. H. RINES 2,553,606

PLURAL IMAGE RADIO LOCATOR SYSTEM

Filed Oct. 9, 1944 5 Sheets-Sheet 5

INVENTOR.
Robert H. Rines
BY
David Rines
ATTORNEY

Patented May 22, 1951 2,553,606

UNITED STATES PATENT OFFICE 2,553,606

PLURAL IMAGE RADIO LOCATOR SYSTEM

Robert H. Rines, Brookline, Mass.

Application October 9, 1944, Serial No. 557,807

29 Claims. (Cl. 178—6.8)

The present invention relates to electric systems, and more particularly to radio-receiving systems that, while having more general fields of usefulness, are especially adapted for use in television.

An object of the invention is to provide a new and improved radio-receiving system.

Another object is to provide a novel combined radio-and-television system.

Another object of the present invention is to provide a new and improved radio-locator system for both detecting the presence of a body and rendering it visible.

A further object is to provide a new and improved system of the above-described character for obtaining a panoramic view.

Other and further objects will be explained hereinafter and will be more particularly pointed out in the appended claims.

Figure 1:
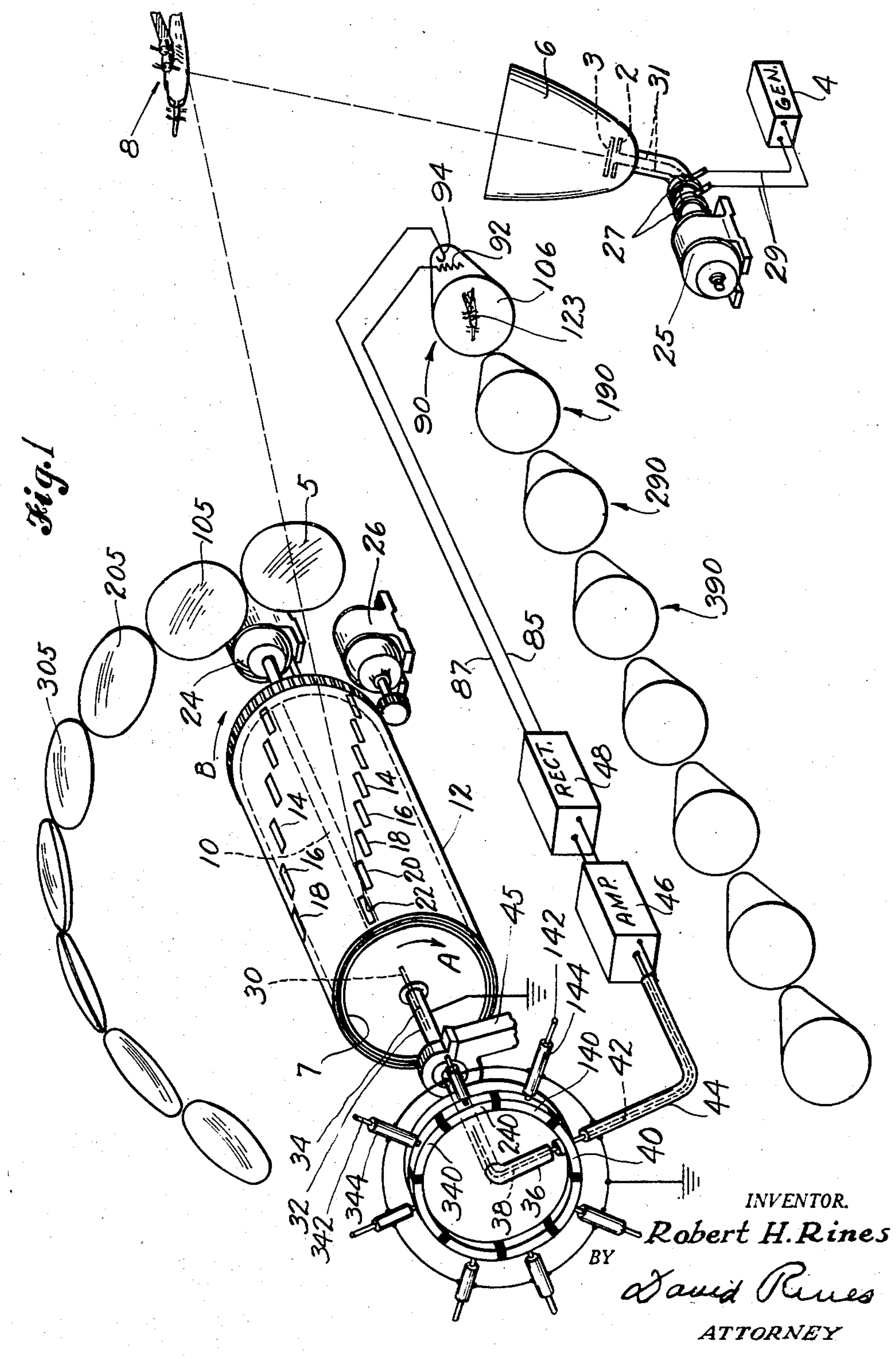
Figure 2:
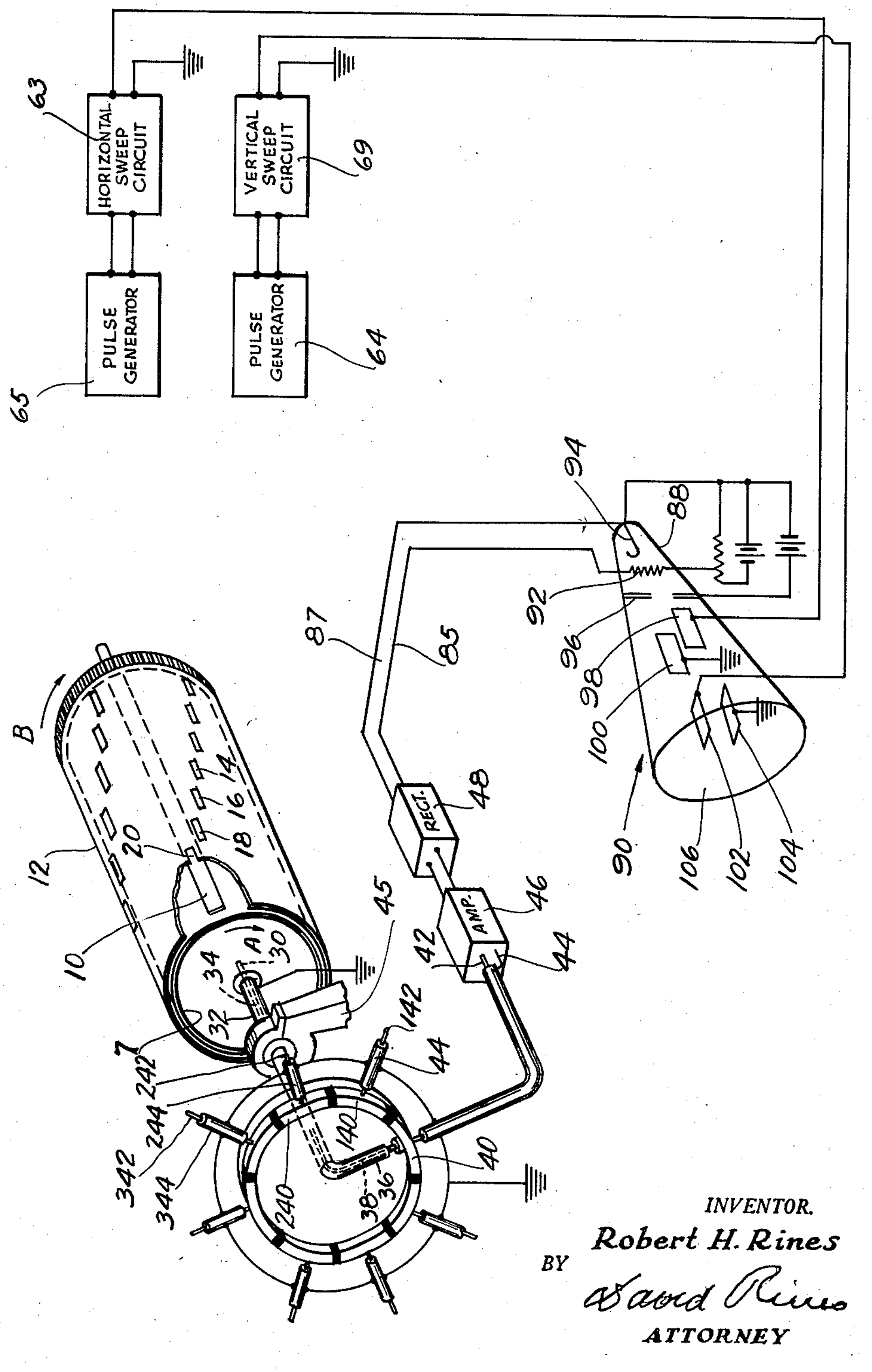
Figure 3:
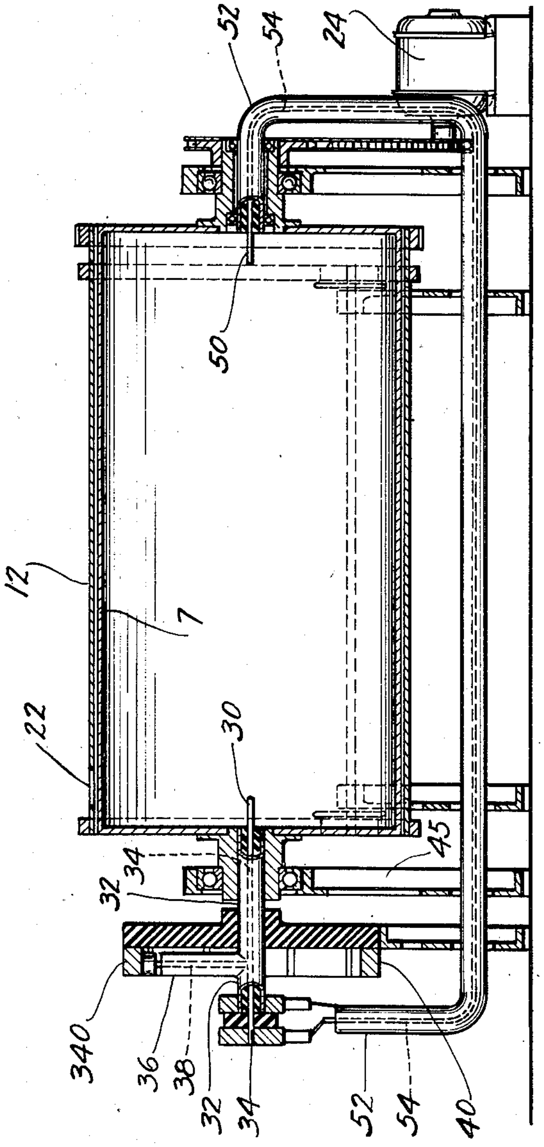
Figure 4:
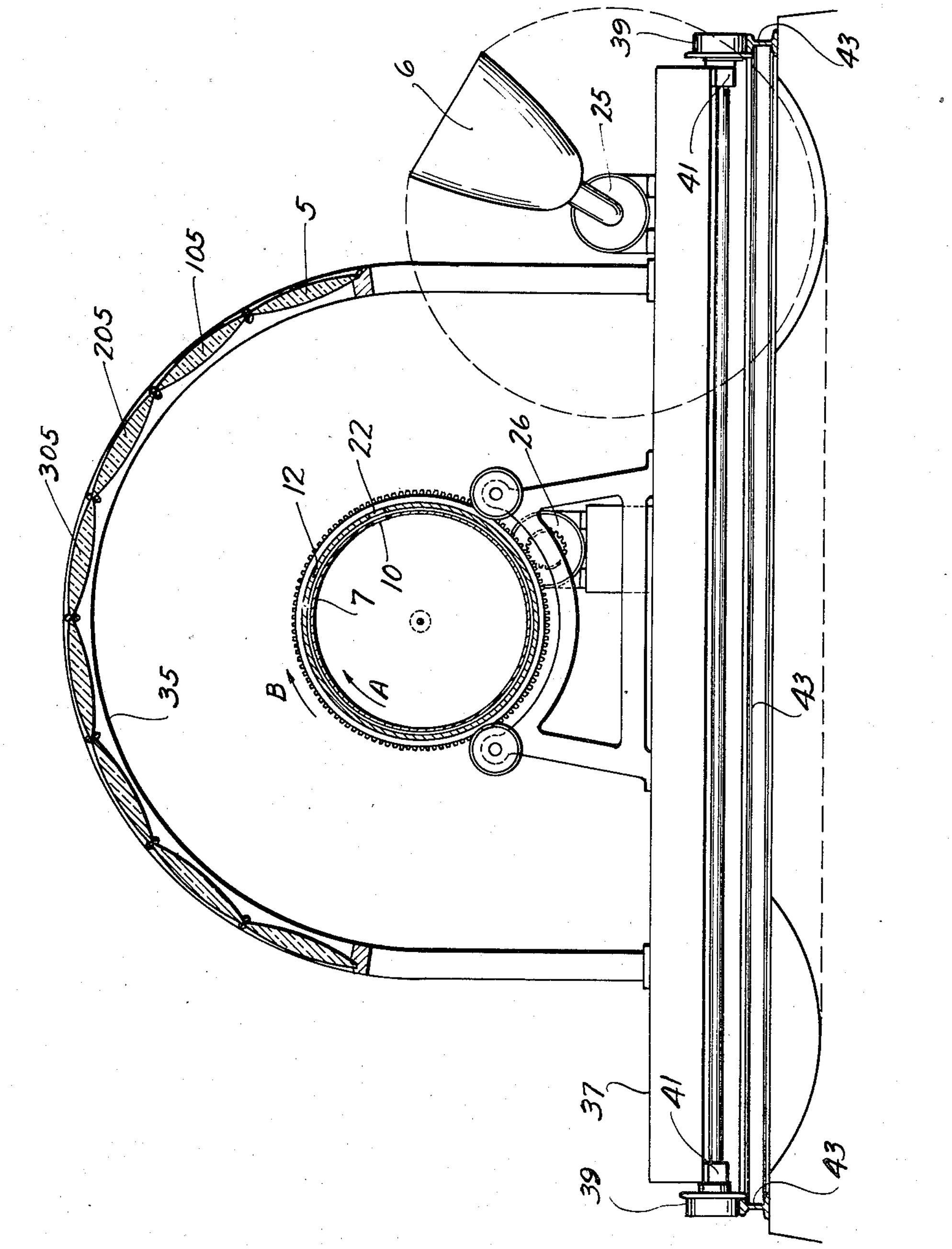
Figure 5:
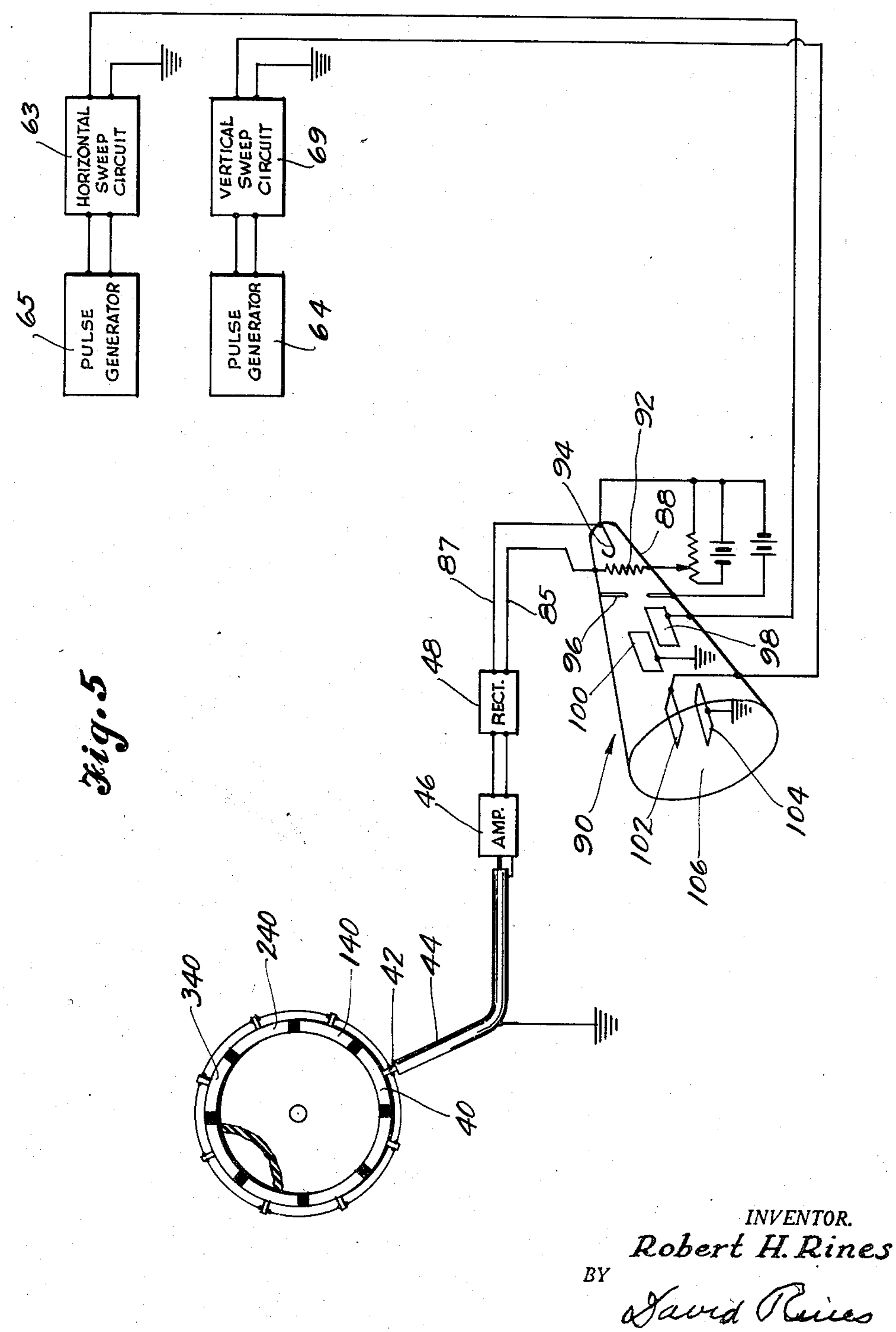

The invention will now be more fully explained in connection with the accompanying drawings, in which Fig. 1 is a diagram showing an airplane object from which radio waves are reflected and scattered to a receiving system in accordance with the present invention; Fig. 2 is a diagrammatic view of circuits and apparatus arranged and constructed in accordance with a preferred embodiment of the invention; and Figs. 3, 4 and 5 are views of modifications.

An electromagnetic wave generator 4 is shown exciting a dipole 2 to produce ultra-high-frequency pulsed-radio energy, say, of 3 or 1.5 centimeters wave-length. A continuous-wave or any other type of modulated-wave generator may be employed, but pulsed energy, at present, has the advantage of economical and easy high-power ultra-high-frequency generation.

The waves emitted by the dipole 2 may be directed by a reflector 3 upon a parabolic reflector 6. The parabolic reflector 6 is shown directing the waves in any desired direction, for example, toward an object, say, an airplane 8, from which they are reflected and scattered toward a receiving station.

At the receiving station, the radio waves thus reflected and scattered from the object 8 may be focused by an electromagnetic dielectric lens 5, such as polystyrene, upon a closed-ended resonant-cavity cylinder circular wave-guide 7. The dielectric lens 5 may be replaced by any other type of well-known lens, mirror or other directive system for focusing the electromagnetic energy scattered or reflected from the object 8 on the cavity cylinder 7.

The resonant-cavity cylinder 7 is provided with a longitudinally extending slot 10. The cylinder 7 is disposed to rotate axially on bearings 45 within a concentrically arranged outer cylinder 12. The outer cylinder 12 may be supported upon semi-circular roller bearings, not shown in order to simplify the drawings. The cylinder 12 is provided with a plurality of sets of slots 14, 16, 18, 20 and 22, the slots of each set, being helically disposed along the cylinder 12. The rotation of the cylinder 7 is effected in the direction of the arrow A by means of a synchronous motor 24, driving a shaft fixed to one of the ends of the cylinder 7. A motor 26 similarly rotates the cylinder 12 in the same direction, indicated by the arrow B; but not in synchronism with the rotation of the cylinder 7.

Assuming, for the moment, the cylinder 7 to be stationary, and the cylinder 12 to be rotating, the radio waves reflected from the airplane 8 will enter the resonant chamber 7 at successively spaced positions along the slot 10, through the slots 14, 16, 18, 20 and 22.

As a result of this construction, therefore, during the rotation of the cylinder 12 through an angle such that the slots 14, 16, 18, 20 and 22 become successively aligned with the slot 10, radio waves reflected or scattered from the object 8 will be focused by the lens 5 at succesive positions along the slot 10 from right to left. In effect, therefore, a horizontal element of the airplane object 8 will become scanned along the slot 10 during this part rotation of the cylinder 12.

Preferably, the cylinder 7 may fit more or less snugly within the cylinder 12, to prevent energy losses through the opening 10. To the same end, the slot 10 may be made quite narrow, consistent with the dimensions and frequencies employed.

The slots 14, 16, 18, 20 and 22, of course, will all directly receive the reflected or scattered radio waves through the lens 5 simultaneously. Only that one of these slots at a time, however, that is aligned with the slot 10 will permit focused radio waves to enter the resonant chamber 7 through the slot 10. The respective slots 14, 16, 18, 20 and 22 will each thus permit the entry into the resonant wave-guide chamber 7 through the slot 10 of a radio-frequency voltage corresponding to the scattering from a corresponding region of the object 8. The slots 14, 16, 18, 20 and 22 will thus receive different field strengths of radio energy, corresponding to the amount of energy reflected or scattered from the various parts of the elemental regions of the object 8 and converged upon them by the lens 5.

The energy thus received in the resonant chamber 7 is picked up by a probe or other antenna 30, which constitutes an extension into the chamber 7, through the other end thereof, of the inner conductor 34 of a coaxial line, the outer conductor of which is shown at 32. This coaxial line is bent at right angles to provide a right-angularly extending coaxial-line leg, the outer conductor of which is shown at 36 and the inner conductor at 38. The coaxial line 32, 34 is fixed to the cylinder 7 so as to rotate axially therewith. The coaxial-leg extension 36, 38, therefore, rotates in a plane at right angles to the axis of the cylinder 7. The inner conductor 38 of the coaxial-leg extension projects beyond the outer conductor 36 to engage, during its rotation, a plurality of circularly arranged contact members, one of which is shown at 40. The contact member 40 is connected, by an inner conductor 42 of a further coaxial line, to an amplifier 46, to which is connected also the outer conductor 44 of the further coaxial line. The amplifier 46 feeds to a rectifier 48. The rectifier 48 is connected by a conductor 85 to the control electrode 92, and by a conductor 87 to the cathode 94, of the electron-gun part 88 of a display oscilloscope 90. It will be understood that all the outer conductors of the before-mentioned coaxial cables have a common connection to ground (not shown).

Electrons emitted from the cathode 94 will become enabled in response to the action of the amplifier 46 and the rectifier 48, to pass by the control grid 92 toward the anode 96 of the tube electron-gun 88 of the oscilloscope 90. The electrons will continue to travel in a stream from the anode 96, between a pair of vertically disposed deflector plates 98 and 100, and between a pair of horizontally disposed deflector plates 102 and 104, to impinge finally on the fluorescent viewing screen 106 of the oscilloscope 90. A horizontal-sweep-time base applied to the horizontally disposed deflector plates 98 and 100 will cause the electron stream from the cathode 94 to become deflected horizontally. The horizontal sweep will become brightened by the energy fed from the amplifier 46 and the rectifier 48 to the control grid 92 of the oscilloscope. Successive energizing voltages are thus produced from the amplifier 46 and the rectifier 48 on the control electrode 92 of the electron-gun part 88 of the cathode-ray-tube 90, of magnitude proportional to the radio-frequency energy received by the corresponding aligned slots. This will permit the passage of the electrons, in quantities dependent upon the radio-frequency energy in the corresponding aligned slots to the anode 96, and between the pairs of deflecting plates 98, 100 and 102, 104, to the viewing screen 106. A visible picture 123 will thus be produced upon the fluorescent viewing oscilloscope screen 106 of the horizontal scanned line of the airplane.

The above description has proceeded upon the assumption that the cylinder 7 is stationary during the rotation of cylinder 12. As the cylinder 7 also rotates in the direction of the arrow A, however, though at a much slower speed, the slot 10 will assume successively lowered positions, thus effecting a scanning of successively lower horizontal elements of the airplane 8.

The vertical-sweep-time base applied to the horizontally disposed deflector plates 102 and 104 will cause the electron stream to become deflected vertically as the slot 10 becomes gradually lowered. Successively lowered horizontal sweeps, graded in intensity corresponding to horizontal elements of the airplane 8, will thus be produced on the oscilloscope screen. The radio-energy picture of the airplane 8, focused by the lens 5 upon the cylinders 7 and 12, therefore, will thus become converted into a visible picture or likeness 123 of the airplane upon the screen 106.

Though only five slots 14, 16, 18, 20 and 22 are shown in each set of slots on the cylinder 12, and though only two sets of these slots are illustrated, it will be understood that this is in order to simplify the drawing, and that, in practice, there will be many sets of these slots; say, as many as fifty sets, more or less; and that there will be many more than five slots in each set; say, as many as two hundred, more or less; all depending upon the dimensions of the cylinders and the frequencies of the radio waves employed. In order properly to excite the cavity 7, the frequency of the radio waves should preferably correspond to the resonant frequency of the cavity. Preferably, moreover, the length of each of these slots may be one-quarter of the wave-length corresponding to the frequency employed. Another probe 50 like the probe 30 may then similarly be employed at the other end of the cylinder 7, so that if there are the proper number of slots in each set, the probes will receive the radiation, allowed in the resonant chamber 7, in phase, and the two signals may be added into the amplifier 46 as shown in Fig. 3.

This additional probe 50 may be connected by means of a coaxial cable comprising an outer conductor 52 and an inner conductor 54, to join with the coaxial line 38, 36, so that the additive energy is fed through the contact member 40 by coaxial line 42, 44 to the amplifier 46.

A pulse generator 65 may be employed to trigger the horizontal time-base-sweep circuit 63 and a further pulse generator 64 may be employed to trigger the vertical-sweep circuit 69, according to conventional and well known television technique.

For example, the pulse generators may be peak oscillators or, more specifically, free-running unbalanced multivibrators. The frequency of the generator 65 should be adjusted to correspond to the period in which a set of slots 14, 16, 18, 20 and 22 completely scans the longitudinal slot 10. A horizontal, time-base sweep will thereby be produced between the vertically disposed deflector plates 98 and 100, corresponding to each horizontal scan of the slot 10 by the sets of slots 14, 16, 18, 20 and 22.

The period of the vertical sweep between the horizontally disposed deflector plates 102 and 104 should correspond to the period in which the slot 10 itself scans, in a vertical sense, the radio-energy picture focused upon it by the lens 5. This may be accomplished by adjusting the frequency of the pulse generator 64 to correspond to the period in which the slot 10 scans the field converged by the lens 5.

The visible picture 123 of the airplane object 8 on the fluorescent screen 106 will accordingly correspond to the radio-frequency picture on the cylinders 7 and 12 which, in turn, corresponds to the actual object 8.

The above description has proceeded upon the assumption that the airplane object 8 is in a position such that the radio waves reflected or scattered therefrom will pass through the lens 5, rigidly fixed in space. It will now be explained how to obtain a panoramic view.

If it be assumed that the airplane object is in a widely different elevation in space, so that the radio waves reflected or scattered therefrom would travel to the receiving station through a different lens, say, the lens 105, the operation above-described would be precisely the same, provided that the coaxial-line leg extensions 36, 38 were to make contact with another contact member 140 connected, through the same amplifier 46 or a different amplifier (not shown, for simplicity), and the same rectifier 48 or a different rectifier (not shown), to another oscilloscope 190, in a manner similar to the connection to the oscilloscope 90. Similarly, if the object 8 were in still a widely different direction in space, such that the radio waves reflected or scattered therefrom were to reach the receiver through another lens 205, the operation would still be the same, provided that the coaxial-line leg 36, 38 were to be connected to a contact member 240 connected, in turn, to still another oscilloscope 290. The receiver 7, 12 is effective along the direction of the lens 5 when the slot 10 occupies angular positions corresponding to that general direction; and it is effective along the direction of the lens 105 when the slot 10 is scanning the waves focused upon it through that lens 105, and so on from, for example, the horizon through the zenith to the oppositely disposed horizon. Eight lenses are illustrated in the drawings, supported by an insulating frame 35, and eight contact members, connected similarly to eight oscilloscopes. The more lenses that are used in this manner, and the more contact members and oscilloscopes, the finer the detail of the images viewed on the screens of the oscilloscopes. These considerations, however, must be balanced against the fact that the dimensions of the dielectric lenses should not be too small compared to the wave-lengths employed.

The same receiver is shown employed with all the dielectric lenses, and all the contact members and oscilloscopes. As the slot 10, during the rotation of the cylinder 7, scans, in a vertical direction, the fields of the successive lenses 5, 105, 205, etc., the wave energy received through those lenses, as the cavity cylinder 7 is horizontally scanned by the slots 14, 16, 18, 20 and 22, is fed through the respective contact members 40, 140, 240, etc., to the respective oscilloscopes. Through the medium of these contact members, the respective oscilloscopes are selectively connected to the receiver 7, 12, when the slot 10 occupies corresponding angular positions. The resonant-cavity receiver 7, therefore, during each revolution thereof, is adapted to receive radio waves from objects in widely different directions, to produce simultaneously likenesses of the objects in these different directions, and simultaneously to display these likenesses on the screens of the respective oscilloscopes.

When the airplane objects 8 occupy widely different elevations in space, however, it may be that the waves transmitted from the dipole 2 that might reach one of the airplanes, might not reach another. It is desirable therefore, that the dipole 2, and the reflector 6 in which it is contained, be rotated in synchronism with the cavity resonator 7. In this manner, the direction of the waves propogated from the reflector 6 will correspond instantaneously to the momentary angular position of the slot 10. This may readily be effected by driving the dipole 2 and its reflector 6 from the same motor 24 that drives the cavity resonator 7 or, as shown, by means of a separate synchronous motor 25, operating in synchronism with the motor 24.

In that event, it may be desirable to connect the dipole 2 to the generator 4 by means of slip rings 27, to which the generator 4 is connected by conductors 29, and to which the dipole 2 is connected by conductors 31 in a horizontally disposed hollow insulating shaft, rotated by the motor 25, and on which the reflector 6 is mounted for rotation in a vertical plane.

It may be desirable that the inner cavity 7 rotate at a high rate of speed, so that the complete field converged by the system of lenses be scanned rapidly. The outer cylinder 12 must then rotate at an even more rapid rate, to effect horizontal scans of the slot 10. In this manner the slot 10 may, for all practical purposes, be regarded as relatively stationary during a horizontal scanning operation.

For simplicity, only a single oscilloscope 90 is shown in Fig. 2. It will be understood, however, that the pulse generators 64 and 65 and the sweep circuits 63 and 69 will preferably be connected to the remaining oscilloscopes in parallel with the oscilloscope 90. Obviously, it is not necessary to employ separate pulse generators and sweep circuits for the separate oscilloscopes. Where a single set of sweep circuits is employed, the bias on the control electrodes of all the oscilloscopes, except one at a time, will prevent the sweeps from appearing except on that one oscilloscope at that time.

According to the modification of Fig. 5, all the likenesses of all the airplane objects may be shown upon a single oscilloscope 106. The contact members 40, 140, 240, etc. are shown all connected to the same inner conductor 42 of the coaxial line 42, 44 that is connected to the amplifier 46. The only further change necessary is to readjust the period of the pulse generator 64 and the vertical-sweep circuit 69 to correspond to the period in which the slot 10 scans the fields converged by the complete system of lenses. Different vertically-positioned areas of the screen will therefore correspond to the scanning of the fields converged by the different lenses. The different areas correspond to the different screens of the other figures.

It is desirable to have the panoramic view in all widely different directions of azimuth. To the attainment of this end, the system of lenses, the receiver 7, 12, the dipole 2 and its reflector 6 are shown in Fig. 4 mounted upon a large platform 37, rotatable about a vertical axis through the receiver. The platform 37 may be manually or motor rotated in any desired manner. To facilitate this, rollers 39 are shown mounted on a flange 41 beneath the platform 37, and resting upon a circular rail 43.

Further modifications will occur to persons skilled in the art, and all such are considered to fall within the spirit and scope of the invention, as defined in the appended claims.

What is claimed is:

1. An electric system having, in combination, radio-receiving means for receiving radio-wave images of objects in widely different directions, and a plurality of means, one corresponding to each of the directions, and respectively controlled by the receiving means in accordance with the radio-wave images received from the respective objects along the respective directions for respectively producing likenesses of the objects from which the radio waves are respectively received by the receiving means.

2. An electric system having, in combination, radio-receiving means for receiving radio-wave images of objects in widely different directions, means for successively rendering the receiving means effective along the different directions, and means controlled by the receiving means when successively rendered effective for producing likenesses of the objects from which the radio waves are received by the receiving means.

3. An electric system having, in combination, radio-receiving means for receiving radio-wave images of objects in widely different directions, means for successively rendering the receiving means effective, and a plurality of means, one corresponding to each of the directions, and respectively controlled by the receiving means in accordance with the radio-wave images received from the respective objects along the respective directions when successively rendered effective for respectively producing likenesses of the objects from which the radio waves are received by the receiving means.

4. An electric system having, in combination, radio-receiving means for receiving radio-wave images of objects in widely different directions, means for successively rendering the receiving means effective along the different directions, a plurality of display means, one corresponding to each of the directions, and means controlled by the receiving means when successively rendered effective for producing likenesses of the objects on the respective display means.

5. An electric system having, in combination, radio-receiving means for receiving radio-wave images of objects in widely different directions, a plurality of display means, one corresponding to each of the directions, and means controlled by the receiving means in accordance with the radio waves received from the respective objects along the different directions for producing likenesses of the respective objects in the respective directions on the respective display mans.

6. An electric system having, in combination, radio-receiving means, means for focusing on the receiving means radio waves from objects in widely different directions to produce radio-wave images of the objects on the receiving means, and means connected with the receiving means and controlled in accordance with the focused radio waves for simultaneously producing likenesses of the objects.

7. An electric system having, in combination, radio-receiving means, means for focusing on the receiving means radio waves from objects in widely different directions to produce radio-wave images of the objects on the receiving means, means connected with the receiving means and controlled in accordance with the focused radio waves for simultaneously producing likenesses of the objects, and means for simultaneously displaying the likenesses.

8. An electric system having, in combination, a receiver for receiving radio-wave images of objects in widely different directions, a plurality of oscilloscopes, one corresponding to each of the directions, and each having a screen, and a plurality of means respectively controlled by the receiver in accordance with the radio-wave images received from the respective objects along the different directions for producing likenesses of the respective objects in the respective directions on the respective screens.

9. An electric system having, in combination, a receiver for receiving radio-wave images of objects in widely different directions, a plurality of oscilloscopes, one corresponding to each of the directions, and each having a screen, means for rendering the oscilloscopes successively effective as the receiver receives waves from the objects in the successively different directions, and means controlled by the receiver in accordance with the radio-wave images received from the respective objects along the different directions for producing likenesses of the respective objects in the respective directions on the respective screens.

10. An electric system having, in combination, radio-receiving means, means for focusing on the receiving means radio waves from objects in widely different directions to produce radio-wave images of the objects on the receiving means, a plurality of oscilloscopes, one corresponding to each of the directions and each having a screen, and means connected with the receiving means and controlled in accordance with the focused radio waves for simultaneously producing likenesses of the objects.

11. An electric system having, in combination, radio-receiving means, means for focusing on the receiving means radio waves from objects in widely different directions to produce radio-wave images of the objects on the receiving means, means for succesively rendering the receiving means effective along the different directions, an oscilloscope having a screen different portions of which correspond to the different directions, means for successively connecting the oscilloscope to the receiving means when successively rendered effective, and means controlled by the receiving means when successively rendered effective for producing on the different portions of the screen likenesses of the objects from which the radio waves are received by the receiving means.

12. An electric system having, in combination, a radio-wave transmitter for transmitting waves toward an object, a radio-wave receiver for receiving the waves reflected or scattered from the object, means for actuating the transmitter to transmit the radio waves toward different objects, means for actuating the receiver in synchronism with the actuation of the transmitter to receive the waves from the different objects, means for focusing on the receiver the waves received from the different objects to produce radio-wave images of the objects, and means connected with the receiver and controlled in accordance with the focused waves for producing likenesses of the objects.

13. An electric system having, in combination, a cavity resonator provided with an opening, means having a plurality of slots adapted to be successively alined with the opening, means for relatively moving the cavity resonator and the successively alining means to cause radio waves from objects in widely different directions to scan the opening, thereby correspondingly to excite the cavity resonator, and means responsive to the radio energy in the cavity resonator for substantially simultaneously producing likenesses of the objects.

14. An electric system having, in combination, a cylindrical cavity resonator provided with a longitudinally disposed opening, means having a plurality of slots adapted to be successively alined with the longitudinally disposed opening, means for relatively moving the cylindrical cavity resonator and successively alining means to cause radio waves from objects in widely different directions to scan the longitudinally disposed opening, thereby correspondingly to excite the cylindrical cavity resonator, and means responsive to the radio energy in the cylindrical cavity resonator for substantially simultaneously producing likenesses of the objects.

15. An electric system having, in combination, a cavity resonator provided with an opening, means for focusing radio waves from objects in widely different directions upon the cavity resonator, means having a plurality of slots adapted to be successively alined with the opening, means for relatively moving the cavity resonator and the successively alining means to cause the radio waves from the objects in the widely different directions successively to scan the opening, thereby correspondingl yto excite the cavity resonator, means for detecting the radio energy in the cavity resonator during the successive alining of the plurality of slots with the said opening, a plurality of cathode-ray tubes, one corresponding to each of the directions, each having means for producing an electron stream and a screen upon which the electron stream may impinge, means for rendering the tubes successively effective as the cavity resonator is excited by the radio waves from the successively different directions, and means responsive to the detecting means cooperative with the successively effective tubes and operable in synchronism with the relative movement of the cavity resonator and the successively alining means to cause the electron streams to scan the screens of the corresponding tubes as they are rendered successively effective, thereby successively to produce on the respective screens likenesses of the respective objects in the respective directions.

16. An electric system having, in combination, a cavity resonator provided with an opening, a plurality of radio-wave focusing means for focusing radio waves from widely different directions upon the cavity resonator, means for causing the radio waves along the different directions to scan the opening, thereby correspondingly to excite the cavity resonator and means responsive to the scanned radio waves for producing an indication thereof.

17. An electric system having, in combination, a cavity resonator provided with an opening, means having a plurality of slots adapted to be successively alined with the opening, a plurality of radio-wave focusing means for focusing radio waves from widely different directions upon the successively alining means, means for relatively moving the cavity resonator and the successively alining means to cause the radio waves from the widely different directions successively to scan the opening, thereby correspondingly to excite the cavity resonator and means responsive to the scanned radio waves for producing an indication thereof.

18. An electric system having, in combination, a receiver for receiving radio-wave images of objects in widely different directions, means for successively rendering the receiver effective along the different directions, a plurality of oscilloscopes, one corresponding to each of the objects and each having a screen, means for selectively connecting the respective oscilloscopes to the receiver when effective along the different directions, and means controlled by the receiver for producing likenesses of the objects on the respective screens.

19. An electric system having, in combination, a receiver for receiving radio-wave images of objects in widely different directions, means for successively rendering the receiver effective along the different directions, a plurality of means for producing likenesses of the objects, and means for selectively connecting the respective likeness-producing means to the receiver when effective along the different directions.

20. An electric system having, in combination, a receiver for receiving electromagnetic-wave images of objects in widely different directions, means for successively rendering the receiver effective along the different directions, a plurality of oscilloscopes, one corresponding to each of the objects and each having a screen, means for selectively connecting the respective oscilloscopes to the receiver when effective along the different directions, and means controlled by the receiver for producing likenesses of the objects on the respective screens.

21. An electric system having, in combination, means for receiving electromagnetic-wave images of different objects sequentially positioned in space along widely different directions, means continuously operable to render the receiving means effective along the different directions repeatedly in sequence, and means connected with the receiving means and controlled in accordance with the electromagnetic waves received from the different objects for producing likenesses of the corresponding objects.

22. An electric system having, in combination, means for receiving electromagnetic waves simultaneously from different objects in widely different directions, means for rendering the receiving means ineffective to receive the electromagnetic waves except along one direction at a time, means for successively rendering the receiving means effective to receive the electromagnetic waves along the different directions successively, and means connected with the receiving means and controlled in accordance with the electromagnetic waves received from the different objects for producing likenesses of the corresponding objects.

23. An electric system having, in combination, means for receiving electromagnetic waves, a plurality of electromagnetic-wave focusing means for focusing on the receiving means electromagnetic waves from different objects in widely different directions to produce electromagnetic-wave images of the objects on the receiving means, and means connected with the receiving means and controlled in accordance with the focused electromagnetic waves from the different objects for producing likenesses of the corresponding objects.

24. An electric system having, in combination, a plurality of electromagnetic-wave focusing means for focusing electromagnetic waves from different objects in widely different directions to produce electromagnetic-wave images, corresponding to the respective objects, means for receiving the electromagnetic-wave images and scanning them, and means controlled in accordance with the scanning for producing likenesses of the corresponding objects.

25. An electric system having, in combination, means for simultaneously producing adjacent radio-wave images of objects, means for receiving the adjacent radio-wave images and successively scanning them, and means controlled in accordance with the scanning for producing adjacent likenesses of the corresponding objects.

26. An electric system having, in combination, means for simultaneously producing a plurality of adjacent radio-wave images of objects located in corresponding adjacent regions of space, means for receiving the adjacent radio-wave images and successively scanning them, and means controlled in accordance with the scanning for producing adjacent likenesses of the corresponding objects.

27. An electric system having, in combination, means for simultaneously producing a plurality of adjacent radio-wave images of objects located in corresponding adjacent regions of space from the horizon to the zenith, means for receiving the adjacent radio-wave images and successively scanning them, and means controlled in accordance with the scanning for producing adjacent likenesses of the corresponding objects.

28. An electric system having, in combination, means for simultaneously producing a plurality of adjacent radio-wave images of objects located in corresponding adjacent regions of space from the horizon through the zenith to the oppositely disposed horizon, means for receiving the adjacent radio-wave images and successively scanning them, and means controlled in accordance with the scanning for producing adjacent likenesses of the corresponding objects.

29. An electric system having, in combination, a circular wave guide adapted to propagate radio waves and provided with longitudinally extending slot means, means for focusing radio waves from objects located in widely different directions upon the wave guide, a cylindrical sleeve rotatably mounted in closely fitting coaxial relation around the wave guide and having a plurality of spaced apertures, means for relatively rotating the sleeve and the wave guide whereby the apertures become successively aligned with the slot means to permit the passage of focused radio waves through the slot means and the successively aligned apertures, and means responsive to the radio waves passed through the slot means for producing likenesses of the objects.

ROBERT H. RINES.

REFERENCES CITED

The following references are of record in the file of this patent:

UNITED STATES PATENTS

| Number | Name | Date |
|---|---|---|
| 1,540,318 | Dunajeff | June 2, 1925 |
| 2,075,808 | Fliess | Apr. 6, 1937 |
| 2,083,292 | Cawley | June 8, 1937 |
| 2,106,770 | Southworth | Feb. 1, 1938 |
| 2,121,771 | Jones | June 21, 1938 |
| 2,135,577 | Herbst | Nov. 8, 1938 |
| 2,151,549 | Becker | Mar. 21, 1939 |
| 2,189,549 | Hershberger | Feb. 6, 1940 |
| 2,207,716 | Bumstead | July 16, 1940 |
| 2,241,586 | Dorsman | May 13, 1941 |
| 2,262,942 | Jones | Nov. 18, 1941 |
| 2,408,435 | Mason | Oct. 1, 1946 |
| 2,409,456 | Tolson | Oct. 15, 1946 |
| 2,415,094 | Hansen | Feb. 4, 1947 |
| 2,416,720 | Teal | Mar. 4, 1947 |
| 2,423,125 | Teal | July 7, 1947 |
| 2,426,189 | Espenschied | Aug. 26, 1947 |
| 2,427,220 | Luck | Sept. 9, 1947 |
| 2,429,933 | Gibson | Oct. 28, 1947 |
| 2,433,368 | Johnson | Dec. 30, 1947 |
| 2,436,380 | Cutler | Feb. 24, 1948 |
| 2,438,735 | Alexanderson | Mar. 30, 1948 |
| 2,442,951 | Iams | June 8, 1948 |
| 2,449,542 | Ayres | Sept. 21, 1948 |
| 2,453,414 | DeVore | Nov. 9, 1948 |
| 2,458,654 | Southworth | Jan. 11, 1949 |

FOREIGN PATENTS

| Number | Country | Date |
|---|---|---|
| 541,959 | Great Britain | Dec. 19, 1941 |
| 659,533 | France | June 29, 1929 |
| 108,556 | Australia | Sept. 28, 1939 |
| 554,472 | Germany | July 8, 1932 |

OTHER REFERENCES

"Radar System Engineering": by Ridenour; 1947, pages 2, 97, 110, 528.

Practical Analysis of Ultra High Frequency, August 1943 (pages 16 to 19).